(12) United States Patent
Lipscombe (10) Patent No.: US 6,883,457 B2
(45) Date of Patent: Apr. 26, 2005

(54) SEATING FOR AMPHIBIOUS VEHICLES

(76) Inventor: Geoffrey Lipscombe, The Coach House, Trinity Street, Leamington Spa, Warwickshire, CV32 5YN (GB)

( * ) Notice: Subject to any disclaimer, the term of this patent is extended or adjusted under 35 U.S.C. 154(b) by 0 days.

(21) Appl. No.: 10/635,312

(22) Filed: Aug. 6, 2003

(65) Prior Publication Data

US 2004/0134409 A1 Jul. 15, 2004

(30) Foreign Application Priority Data

Aug. 10, 2002 (GB) .......................................... 02186047

(51) Int. Cl.[7] .............................................. B63B 17/00
(52) U.S. Cl. ..................................................... 114/363
(58) Field of Search ......................... 440/12.5; 114/363; 297/105, 130, 283.3, 338, 248, 333; 296/65.01, 65.13, 65.14

(56) References Cited

U.S. PATENT DOCUMENTS

| | | | |
|---|---|---|---|
| 4,842,318 A | | 6/1989 | Fussnegger |
| 4,889,379 A | | 12/1989 | Aso |
| 5,619,949 A | * | 4/1997 | Dick, Jr. ..................... 114/363 |
| 6,482,052 B1 | * | 11/2002 | Giljam .................... 440/12.51 |

FOREIGN PATENT DOCUMENTS

JP    57084236    5/1982

* cited by examiner

Primary Examiner—Stephen Avila
(74) Attorney, Agent, or Firm—Calfee, Halter & Griswold (57) ABSTRACT

Seat 2 is mounted to slide blocks 24 and rails 22, which in turn are mounted to upstanding brackets 20. The fore-and-aft adjustment of the seats is thus raised above the level of floor 16, avoiding fouling by sand and dirt; corrosion; and shorting where electric seat adjustment is used. Seat 2 comprises frame 4, backrest 14, and tip-up seat 8 which can be raised around pivots 6, 6' to allow a higher seating position for marine use. In marine mode, the helmsman sits on cushion 10; in road mode, the driver sits on cushion 12. Latches are provided for fore-and-aft and tip-up cushion adjustment. Flaps 26 may protect sliding surfaces from contamination. Rails 22 may face upwards (34, FIG. 3), downwards (44, FIG. 4), or sideways, as convenient; the seat may be supported on a cradle (40, FIG. 4). Slide blocks may be replaced by rollers (32, FIGS. 2, 6).

19 Claims, 9 Drawing Sheets

SEATING FOR AMPHIBIOUS VEHICLES

CROSS REFERENCE TO RELATED APPLICATIONS

The present application claims priority from GB Patent Application Serial No. 02186047, filed Aug. 10, 2002.

The present invention relates to an amphibious vehicle having a seat adjustable in a fore and aft direction relative to a floor of the vehicle.

BACKGROUND OF THE INVENTION

Amphibious vehicles normally have at least the driver's seat adjustably mounted to the floor of the vehicle by means of a track comprising a pair of rails attached directly to the floor. The seat engages with the track by means of rollers and a latch is provided to hold the seat at a particular position by latching onto the rail. This type of arrangement is also used for normal road vehicles. A problem with amphibious vehicles is that when they are open topped, water splashes into the vehicle and may slop around on the floor; and sand may also blow into the vehicle. The combination of sand and water in and around the seat track may well cause corrosion and/or jamming of the seat on its track. This would be the situation if a seat mounting of the sort shown in U.S. Pat. No. 4,889,379 (Aso) were fitted to an amphibious vehicle.

A further problem is that steering an amphibious vehicle in its marine mode requires the driver to sit higher than the position best suited for road use. This is even more the case where the vehicle is designed to plane, as a favourable static weight distribution to allow planning is tail heavy, so that the vehicle sits nose up when afloat; and even more nose up when planing. Passengers may also appreciate the option of a higher seating position on water, for improved visibility, and for the exhilaration of the wind in their faces. However, a lower seating position on land is preferred to allow better protection from wind and in vehicle collisions; also greater comfort at the higher speeds attained on roads than on water.

If a higher seating position is offered for marine use, the centre of gravity of the vehicle occupants will be raised, compared to their centre of gravity on road. If conventional seat mountings are used, with dual seat tracks below the seat and inboard of the edges of the seat, the vertical distance from the seat mounts to the occupant's torso is much greater than the lateral distance between the seat tracks. The seats may oscillate as the occupants shift from side to side according to the movement of the vehicle, causing the occupants to feel insecure. The high bending moments applied to seat and mounting components may also cause rapid wear.

The issue of perceived seat stability is particularly germane to a centre mounted seat, as there is no practical possibility in this case of the occupant restraining himself or herself against the vehicle interior trim on door, side panel, or centre console, should the seat mounting be considered to have lateral movement beyond the occupant's envelope of comfort and security.

SUMMARY OF THE INVENTION

The object of the invention is to provide an arrangement for support of a seat sufficiently far above the floor of an amphibious vehicle to avoid the above problems; and to enable the driver to sit above the road seating position so as to assist steering when on water.

Accordingly, there is provided an amphibious vehicle having a seat frame structured to support a seat, the frame being adjustable in a fore and aft direction relative to a floor by means of an adjustment arrangement; the arrangement comprising at least a first part and a second part, the first part mounted fixedly to the seat frame and the second part co-operating with the first part and mounted fixedly with relation to the floor, above the floor and level with or above the bottom of the seat frame, wherein the seat frame has a tip-up seat pivotally mounted thereto so as to provide two levels of seating.

Such an arrangement according to the invention ensures that the seat adjustment mechanism is above the dirt and slop level, and reduces the likelihood of jamming caused either by corrosion; or by the build-up of material in and around tight fitting parts. The arrangement also enables the driver to assume an elevated single position when on water. Furthermore, seat mountings according to the invention have a lower ratio of cushion height to mounting width than prior art amphibious vehicle seats, allowing provision of a more stable seat mounting with greater resistance to wear in service.

The co-operating parts of the seal adjustment mechanism may be a slide and a rail; or a roller or rollers and a rail. These parts may be mounted so that the rail is fixed in relation to the floor of the vehicle, or so that the rail is fixed to the seat. The co-operating parts are preferably mounted well above the floor, and in one embodiment of the invention the inter-engagement between the co-operating parts is at a level at about the same as the top of the seat cushion, the seat cushion being distinct from the backrest. At this latter level, a latch for fixing the seat adjustment is more convenient than at a level below the seat, as is normal with known arrangements. Furthermore, electrically operated seat adjustment can be kept well away from water and slops. The rails may face upwards, downwards or sideways depending on the room available for mounting on either side of the seat. Where the rails are mounted facing sideways, the seat may have flexible splash guards fixed to the seat above the rails on either side of the seat to further guard the track.

Although the seat mounting according to the invention is considered to be most advantageous when applied to a driver's seat, it is equally suitable for passenger seating in a first or further row of seating. The driver's seat may be to one side of the vehicle, or may be centrally mounted to ensure equal visibility to either side of the vehicle, particularly in marine mode. The vehicle may be a planing vehicle.

The above and other objects, features and advantages of the present invention will become apparent from the following detailed description, which is to be read with reference to the accompanying drawings in which:

DESCRIPTION OF THE PREFERRED EMBODIMENTS

Figure 1:
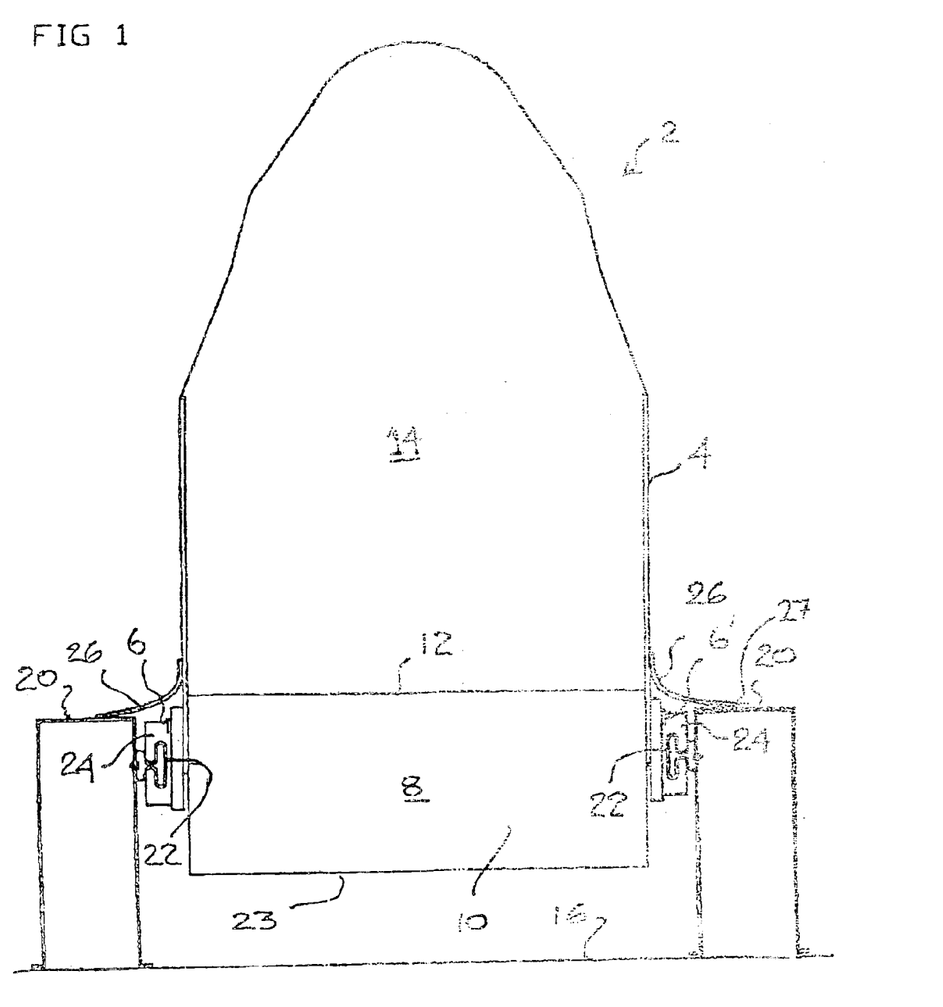
FIGS. 1 to 4 are front elevations of four different arrangements of sliding and rolling mountings for seats according to the invention.
Figure 5:
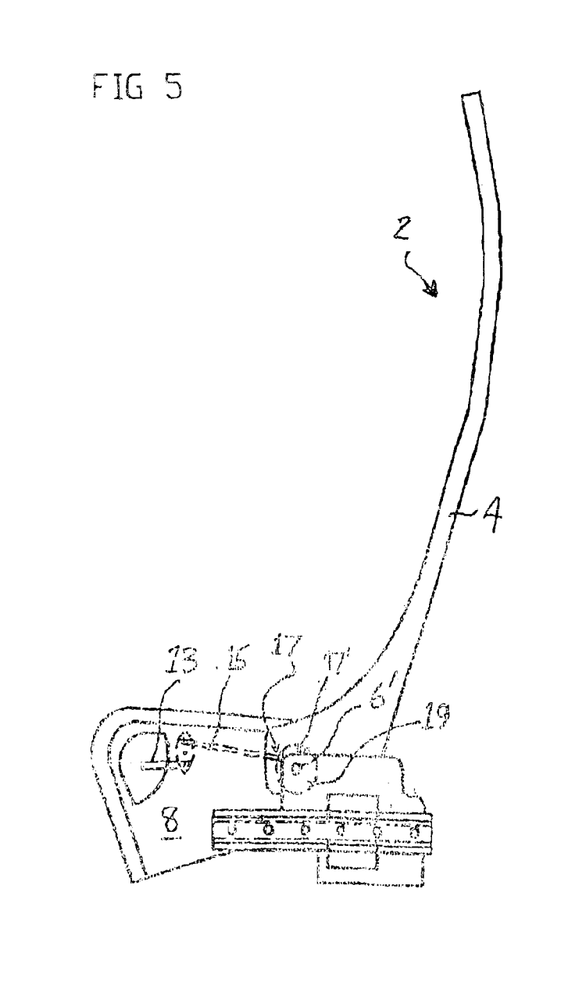
FIG. 5 is a side elevation of a sliding arrangement according to the invention similar to that shown in FIG. 1.
Figure 7:
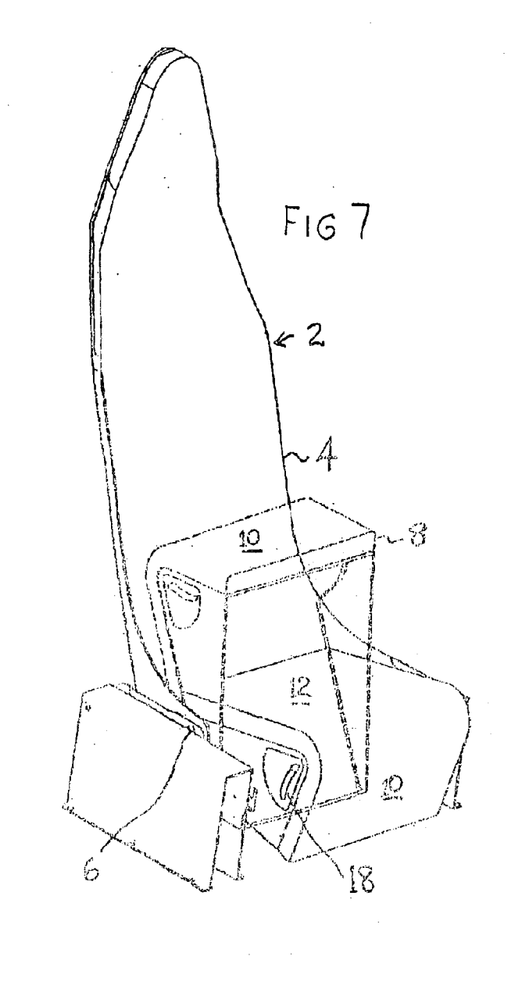
FIG. 7 is a perspective view of the seat shown in FIG. 5 seen from a partly starboard angle.
Figure 8:
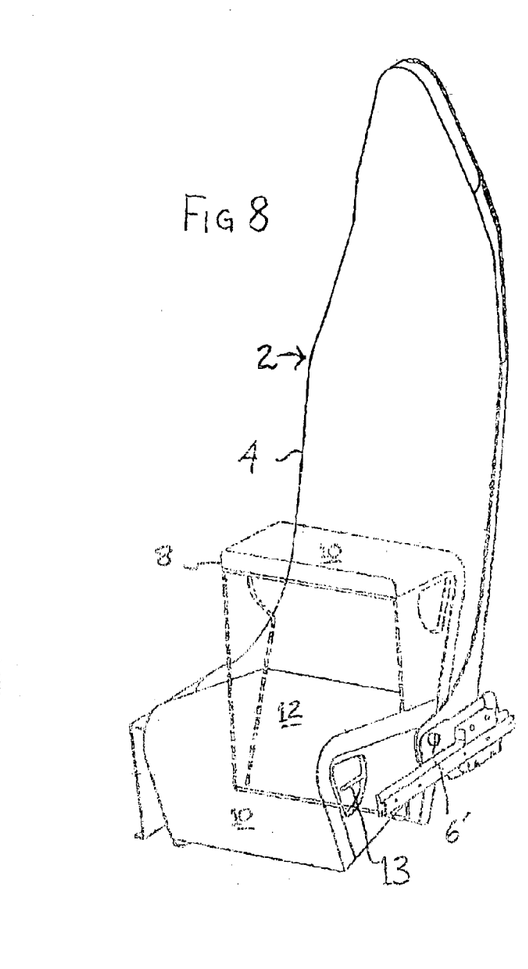
FIG. 8 is a perspective view of the seat shown in FIG. 5 from a partly port angle.

FIG. 1 shows a seat generally at 2 having a frame 4. A tip-up seat cushion 8 is pivotally mounted at pivots 6 and 6'—see also FIGS. 5, 7, and 8 for similar seats. In FIGS. 7 and 8 the tip-up seat 8 is shown in the down/road driving position in said lines: whilst the seat 8 is shown in the up/water driving position in broken lines. The seat 8 has a locking handle 13 on one side, which operates as shown in FIG. 5. Handle 13 actuates pin or bar 15, shown in broken lines; which in turn engages one of two notches 17, 17' in circular plate 19 on the pivot axis 6–6', to hold tip-up seat 8 in one position or the other.

The driver or helmsman sits on the tip-up cushioned seating area 10 when the seat is in the up, or water, position; and on seat cushion 12 when the seat is in the down, or road, position. Numeral 14 denotes the backrest.

A further locking handle 18 is provided on the other side of seat 2 to handle 13. This further handle is used to lock the fore-and-aft adjustment of the seat, by latch means known in the vehicle seating art.

The seat 2 is mounted well above the floor 16 of the vehicle on brackets 20 either side of the seat by means of co-operating parts; enabling the seat to be adjustable in a fore and aft direction relative to the floor 16 as will be described.

So far each embodiment is much the same; and the same reference numerals are used for similar or identical parts.

In FIGS. 1, 5, 7 and 8, the co-operating parts are firstly slide rails 22 fixed to the brackets 20 on either side above the bottom 23 of seat 2; and secondly slide blocks 24 fixed to frame 4 of seat 2. The brackets 20 are of course fixed to the floor 16 of the vehicle. In order to stop water splashing onto the co-operating parts, flexible flaps 26 are fixed to seat frame 4. These may be treated with friction decreasing material at 27 where they engage the top of brackets 20.

Figure 2:
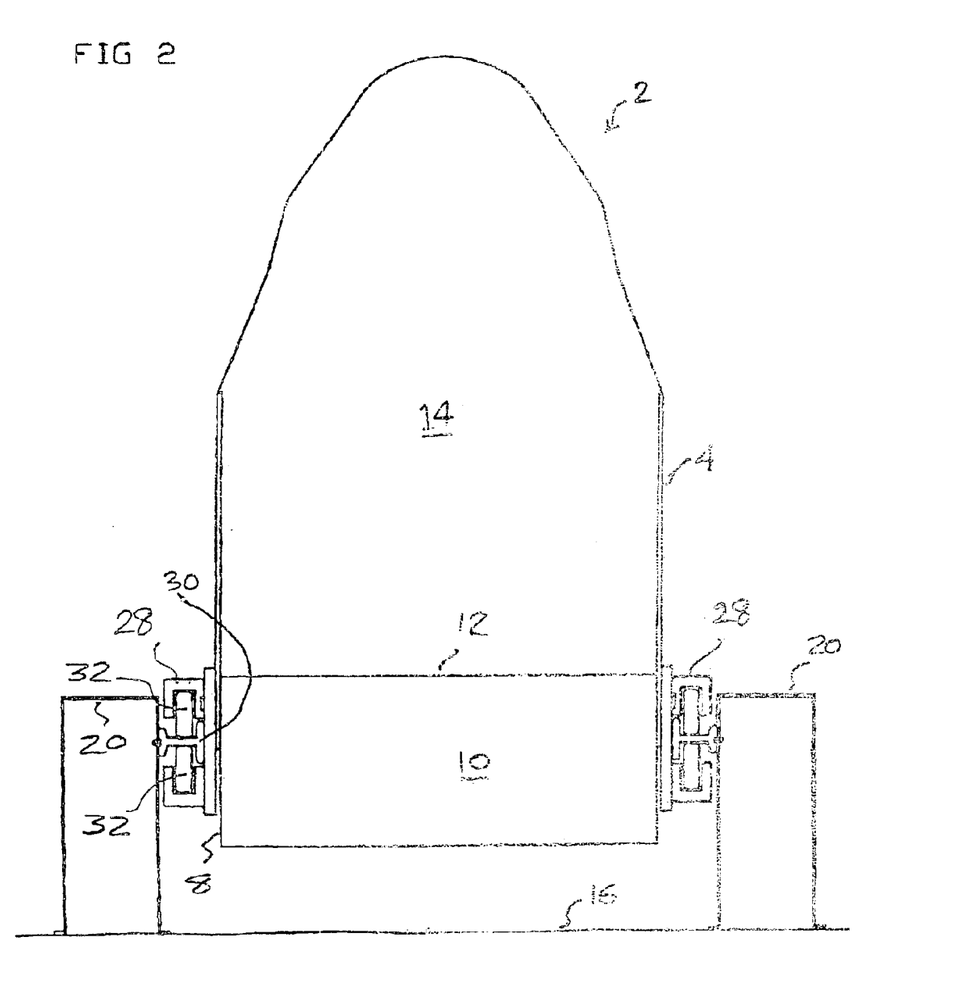
Figure 6:
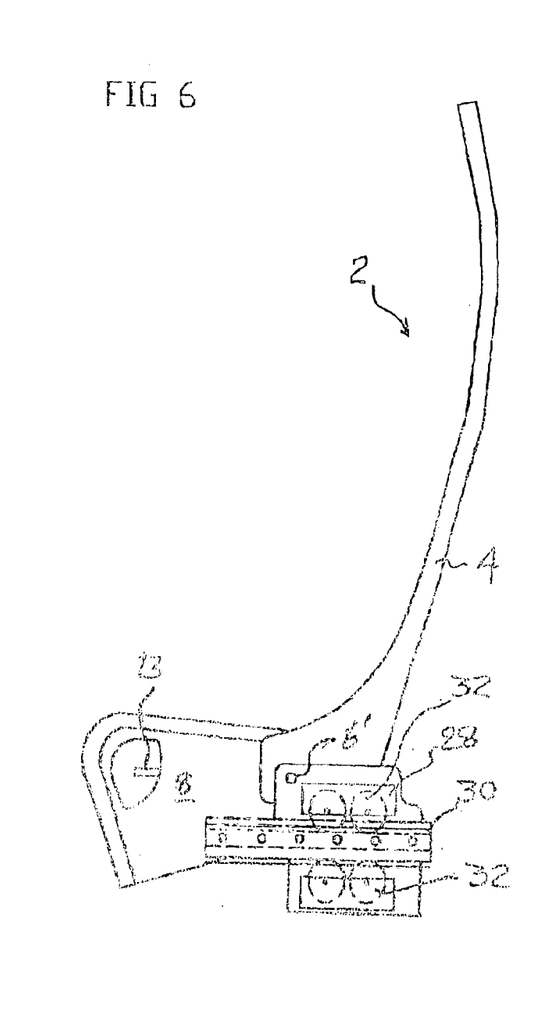
FIG. 6 is a side elevation of a rolling arrangement according to the invention similar to that shown in FIG. 2.

In FIG. 2 and FIG. 6, slide blocks 24 are replaced by roller blocks 28; and rails 22 are replaced by rails 30 arranged to receive rollers 32 in roller blocks 28.

Figure 3:
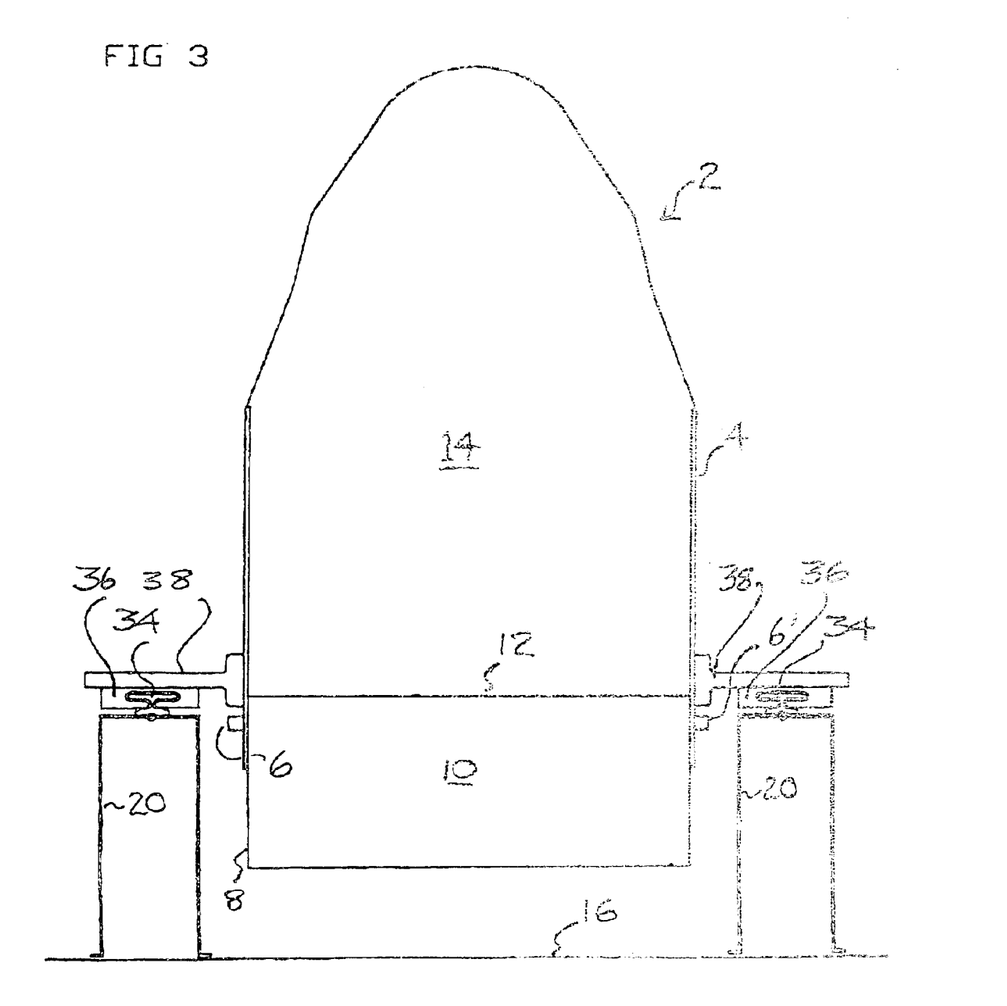
Figure 4:
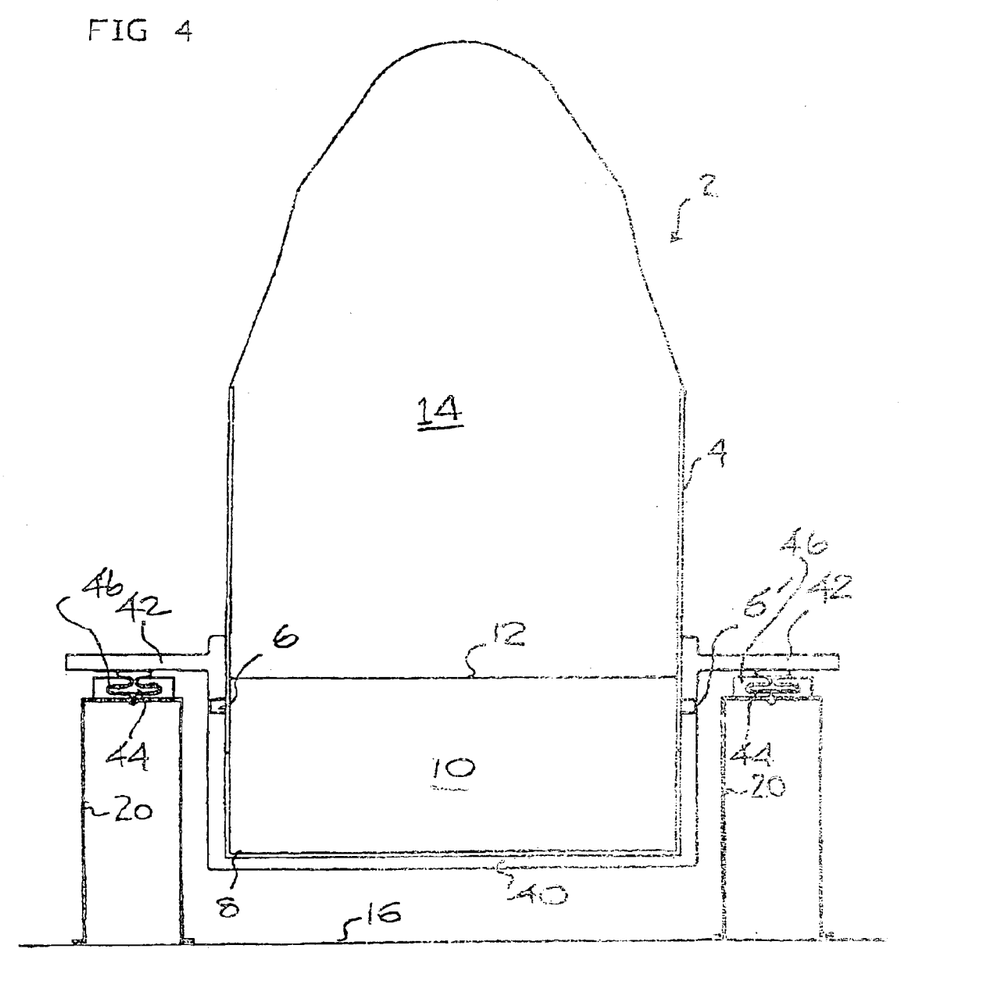

In FIG. 3, slide rails 34 are mounted on the tops of brackets 20. The rails co-operate with slide blocks 36 mounted underneath, and fixed to, brackets 38. In FIG. 4, brackets 38 are replaced by a cradle 40 with extending arms 42. The cradle supports the whole seat 2. Arms 42 have rails 44 fixed below, which co-operate with slide blocks 46 mounted on the top of brackets 20.

Figure 9:
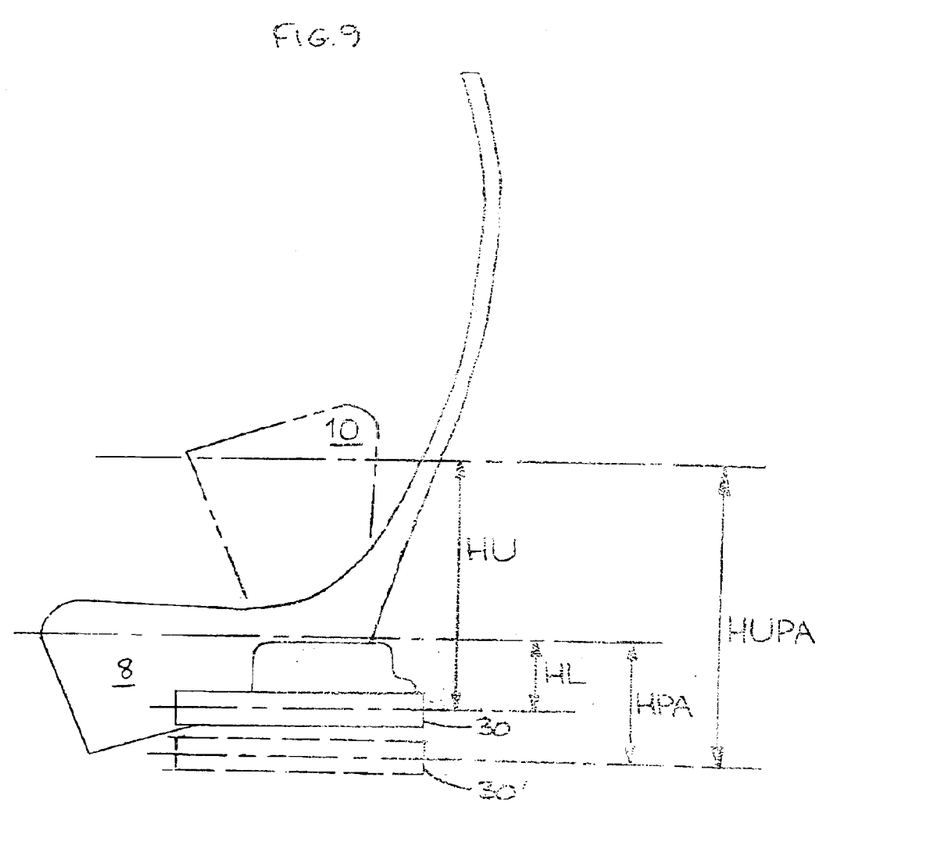
FIG. 9 is a side view of a seat mounting according to the invention, compared to the prior art.

In FIG. 9, the tip up seat 8 is shown in its lower, or road going position, and in is upper, or marine position. A seat track 30 is shown according to the invention; and a further seat track 30' is also shown in a floor mounted position typical of prior art. A height HU is shown from a marine seating position; with the foam compressed by the weight of the driver, to the seat track according to the invention. A further height HL is also shown from a road seating position to the seat track according to the invention; and finally, a height HF is shown, from a road seating position to the centre height of floor mounted seat track position typical of prior art. As the compression of the foam will vary according to driver weight, the following typical dimensions are measured with foam uncompressed: HU equals 277 mm; HL equals 121 mm; and HPA equals 201 mm. Were a tip-up seat according to the invention to be mounted on prior art seat mountings, the height from a tip-up seat to floor mounted seat tracks would be HUPA, equal to 357 mm.

Figure 10:
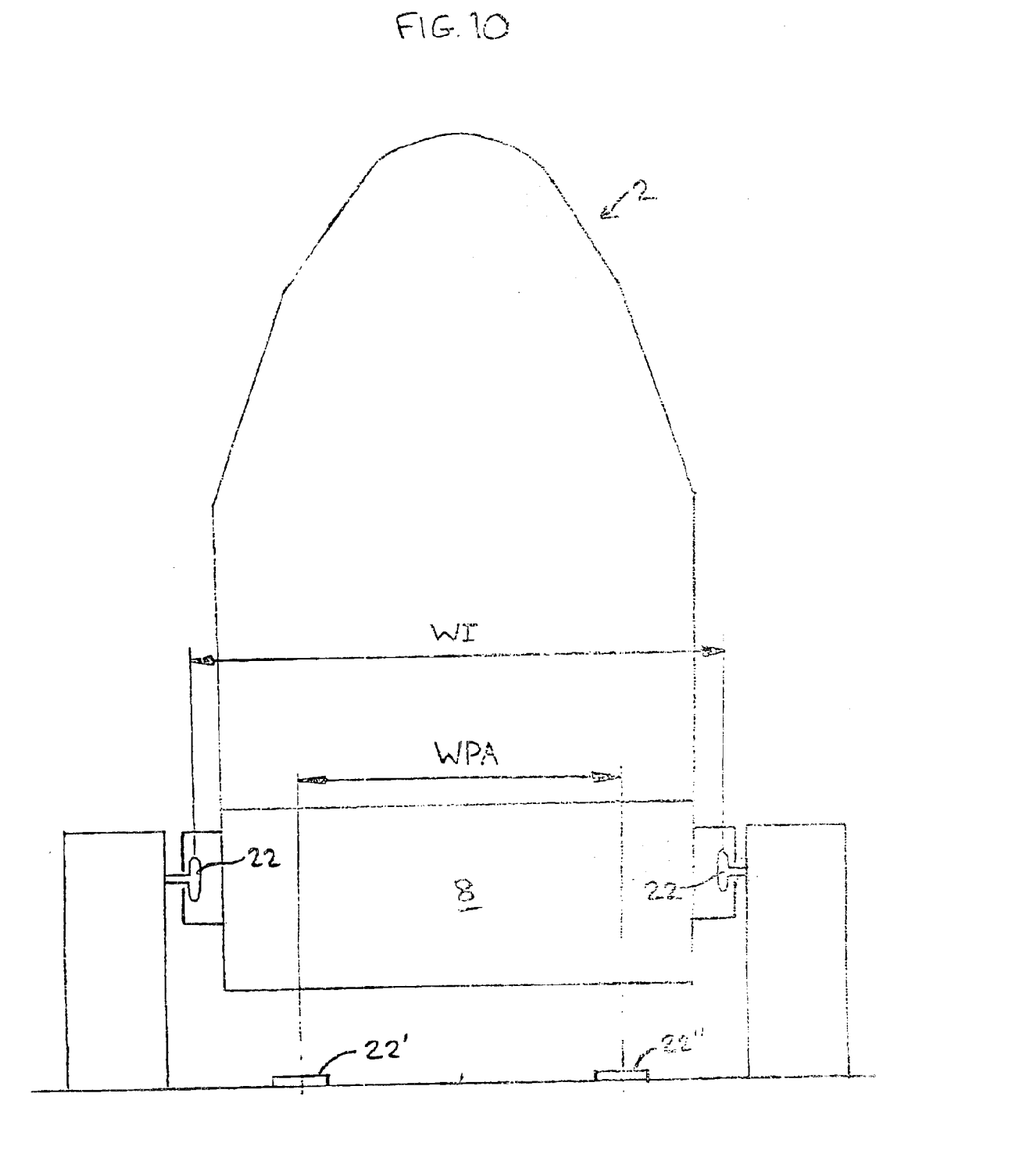
FIG. 10 is a front view of a seat mounting according to the invention, compared to the prior art.

Similarly in FIG. 10, slide rails according to the invention are shown at 22; and floor mounted slide rails typical of prior art are shown at 22' and at 22". The width between seat mountings 22 according to the invention, WI, is typically 504 mm; whereas the width between floor mounted slide rails typical of prior art WPA is typically 420 mm.

A measure of the stability of the seat in use may be found by dividing the width between seat mountings by the height from seat cushion to seat mounting. Using the above figures, this stability ratio is: 1.82 for the marine seating position according to the invention, as opposed to 1.18 for the marine seating position with a prior art seat mounting; and 4.17 for the road seating position according to the invention, as opposed to 2.09 for the road seating position with a prior art seat mounting. It should be noted that these figures would demonstrate an even greater advantage over prior art were the seat track position of FIG. 3 to be used instead. It is preferred that the stability ratio is at least 1.50, more preferably 1.75, in marine mode; and at least 3.50, more preferably 4.00 in road mode. To limit the space taken up by seat mountings in the width direction, the stability ratio should preferably be below 2.40, more preferably 1.95, in marine mode; and preferably below 5.50, more preferably 4.50, in road mode.

Figure 11:
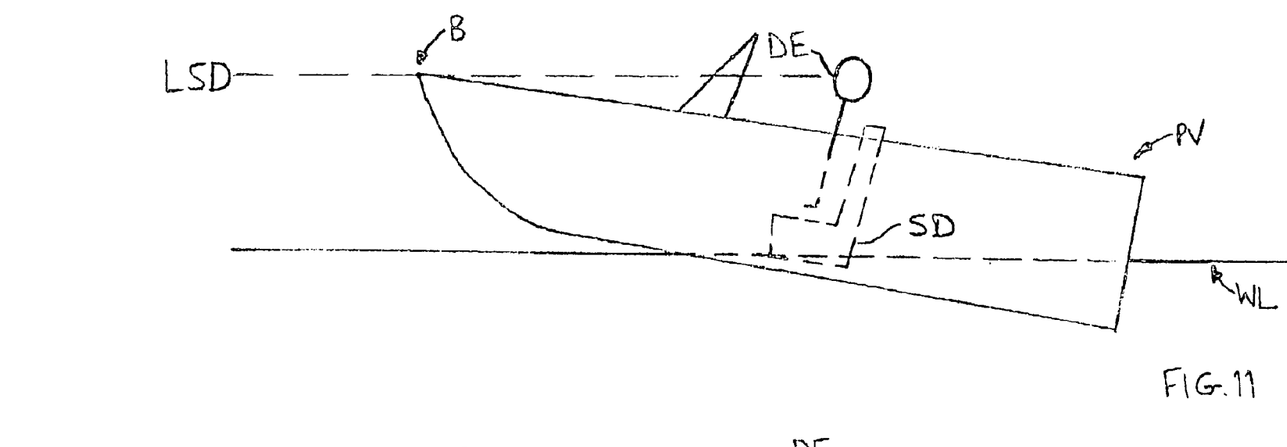
FIGS. 11 and 12 are figurative side views of a planing amphibious vehicle according to the invention, showing the visibility advantage of a dual height seating system.
Figure 12:
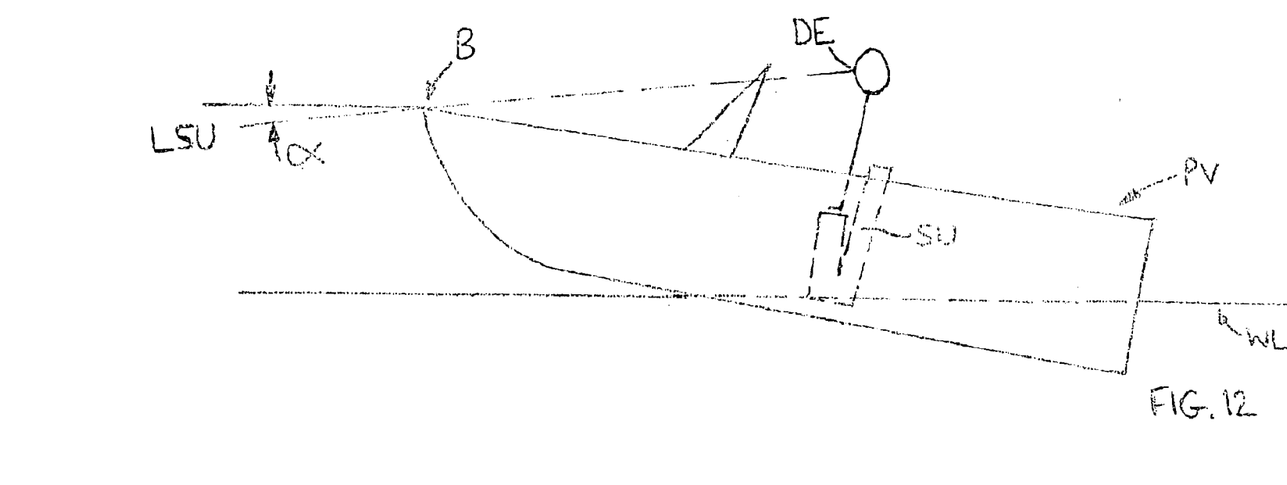

Finally, FIGS. 11 and 12 show simplified side views of a planing amphibious vehicle PV. Such a vehicle may comprise retractable road wheels (not shown) in order to allow it to plane. In each figure, the water line is designated WL. In FIG. 11, the driving seat is in its lower, road going position SD; and the driver's eye level DE is below the top of the windscreen, but level with bow B. Hence, the driver's line of sight LSD is level, and the driver cannot see anything below the bow when the vehicle is on the plane. In FIG. 12, however, the seat is in its upper position SU. Hence, the driver's eye level DE is above the top of the windscreen; and the driver's line of sight LSU looks down over bow B, subtending an angle α to the horizontal. Hence, the driver has a deeper field of view, and vehicle safety is enhanced. This is particularly important since if the vehicle is being driven over salt water, salt spray may tend to cloud the windscreen; at least in the area outside the sweep of the windscreen wiper(s).

Further variations to the above embodiments may be incorporated as required. For example, as is known in the automotive art, the seat may also have a reclining backrest; tilt and/or height adjustment; one or more electrically driven seat adjustment controls, with or without memory settings; heating or cooling; and adjustable lumbar and/or thigh support. It may also be feasible to build in airbags and/or other restraint systems. The seat padding may be covered in any suitable and/or desired material.

Although the present invention has been described and illustrated in detail, it is to be clearly understood that the same is by way of illustration and example only, and is not to be taken by way of limitation. The spirit and scope of the invention are to be limited only by the terms of the appended claims.

I claim:

1. An amphibious vehicle having a seat frame structured to support a seat, the frame being adjustable in a fore and aft direction relative to a floor by means of an adjustment arrangement, the arrangement comprising at least a first part and a second part, the first part mounted fixedly to the seat frame and the second part co-operating with the first part and mounted fixedly with relation to and above the floor and not below the seat frame, wherein the seat frame has a tip-up seat pivotally mounted thereto so as to provide two levels of seating, and wherein the ratio of the width between the seat mountings to the height from the driver's seat cushion to the centre level of the seat mounting track is between 1.50 and 2.40 with the seat in its upper, or marine, position.

2. A vehicle as claimed in claim 1, wherein the first part comprises a slide block, and the second part comprises a rail arranged to cooperate with the slide block.

3. A vehicle as claimed in claim 1, wherein the second part comprises a slide block, and the first part comprises a rail arranged to cooperate with the slide block.

4. A vehicle as claimed in claim 1, wherein the first part comprises a roller block, and the second part comprises a rail arranged to cooperate with the roller block.

5. A vehicle as claimed in claim 1, wherein the second part comprises a roller block, and the first part comprises a rail arranged to cooperate with the roller block.

6. A vehicle as claimed in claim 1, wherein the second part is mounted to a bracket, the upper surface of which extends above the bottom of the seat, the bracket being mounted to the floor.

7. A vehicle as claimed in claim 1, wherein a driver's seat is fixed to the seat frame.

8. A vehicle as claimed in claim 1, wherein a passenger seat in a front row of seating is fixed to the seat frame.

9. A vehicle as claimed in claim 1, wherein a seat in a further row of seating behind a first row of seating is fixed to the seat frame.

10. An amphibious vehicle according to claim 1, where the vehicle is a planing vehicle.

11. A vehicle as claimed in claim 1, wherein the ratio of the width between the seat mountings to the height from the driver's seat cushion to the centre level of the seat mounting track is between 1.75 and 1.95 with the seat in its upper, or marine, position.

12. A vehicle as claimed in claim 1, wherein the ratio of the width between the seat mountings to the height from the driver's seat cushion to the centre level of the seat mounting track is between 3.5 and 5.5 with the seat in its lower, or road, position.

13. A vehicle as claimed in claim 12, wherein the ratio of the width between the seat mountings to the height from the driver's seat cushion to the centre level of the seat mounting track is between 4.0 and 4.5 with the seat in its lower, or road, position.

14. A vehicle as claimed in claim 2, wherein the rail is substantially covered by an extending part of the seat frame.

15. A vehicle as claimed in claim 3, wherein the rail is substantially covered by an extending part of the seat frame.

16. A vehicle as claimed in claim 4, wherein the rail is substantially covered by an extending part of the seat frame.

17. A vehicle as claimed in claim 5, wherein the rail is substantially covered by an extending part of the seat frame.

18. An amphibious vehicle having a seat frame structured to support a seat, the frame being adjustable in a fore and aft direction relative to a floor by means of an adjustment arrangement, the arrangement comprising at least a first part and a second part, the first part mounted fixedly to the seat frame and the second part co-operating with the first part and mounted fixedly with relation to and above the floor and not below the seat frame, wherein the seat frame has a tip-up seat pivotally mounted thereto so as to provide two levels of seating, and wherein the ratio of the width between the seat mountings to the height from the driver's seat cushion to the centre level of the seat mounting track is between 3.5 and 5.5 with the seat in its lower, or road, position.

19. A vehicle as claimed in claim 18, wherein the ratio of the width between the seat mountings to the height from the driver's seat cushion to the centre level of the seat mounting track is between 4.0 and 4.5 with the seat in its lower, or road, position.

* * * * *